United States Patent [19]

Marks

[11] 4,128,001

[45] Dec. 5, 1978

[54] PARALLEL BEAM LOAD CELL INSENSITIVE TO POINT OF APPLICATION OF LOAD

[75] Inventor: Eugene A. Marks, Riverside, Calif.

[73] Assignee: Transducers, Inc., Whittier, Calif.

[21] Appl. No.: 833,818

[22] Filed: Sep. 16, 1977

[51] Int. Cl.² .......................... G01L 1/22; G01L 25/00
[52] U.S. Cl. ..................................... 73/1 B; 73/141 A
[58] Field of Search ............. 73/1 B, 141 A; 177/211

[56] References Cited

U.S. PATENT DOCUMENTS

| | | | |
|---|---|---|---|
| 3,439,761 | 4/1969 | Laimins | 73/141 A |
| 3,576,128 | 4/1971 | Lockery | 73/141 A |
| 3,927,560 | 12/1975 | Farr | 73/141 A |
| 3,968,676 | 7/1976 | Ormond | 73/1 B |

*Primary Examiner*—Anthony V. Ciarlante
*Attorney, Agent, or Firm*—Saul Epstein

[57] ABSTRACT

A parallel beam load cell wherein sensitivity to transverse load position changes is reduced by changing the shape of one of the beams in the vicinity of one strain gage element whereby the neutral axis of said beam is changed with respect to said strain gage element. Longitudinal load position sensitivity is reduced by changing the cross sectional area of one of the beams adjacent one strain gage element.

37 Claims, 10 Drawing Figures

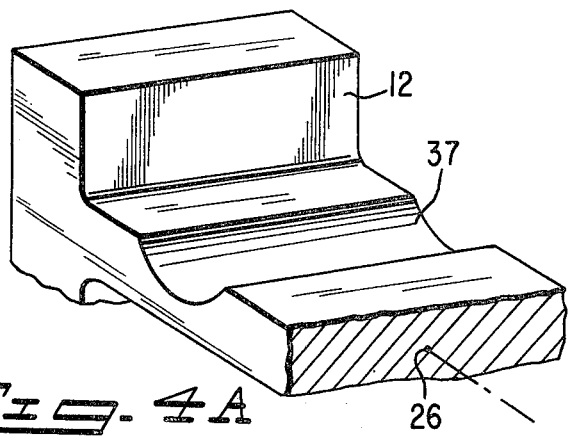
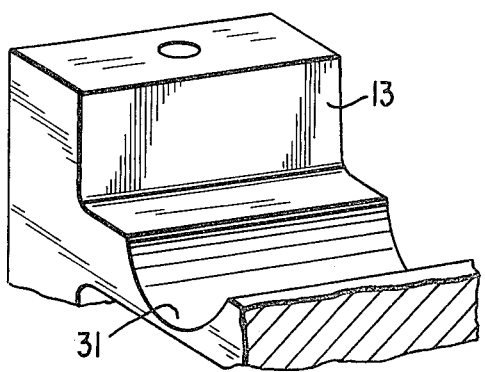
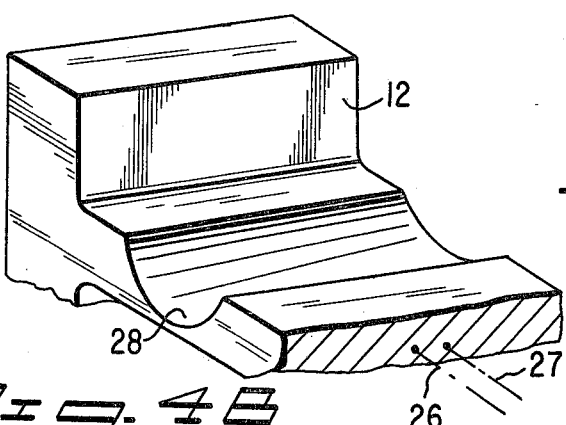
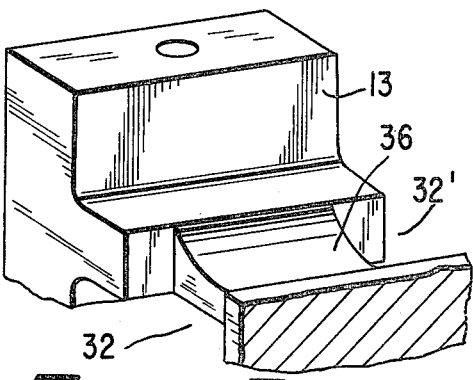
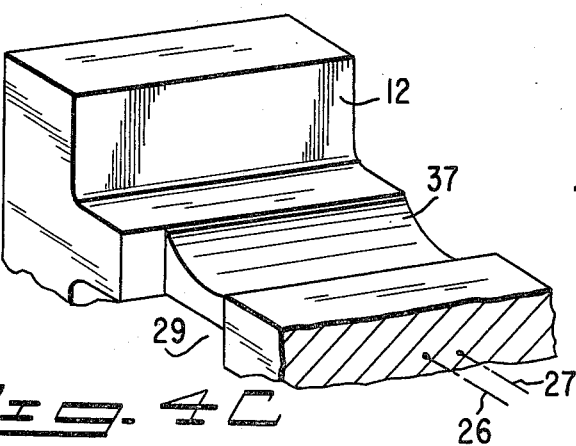
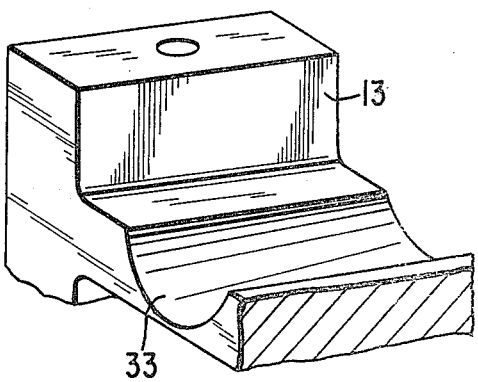
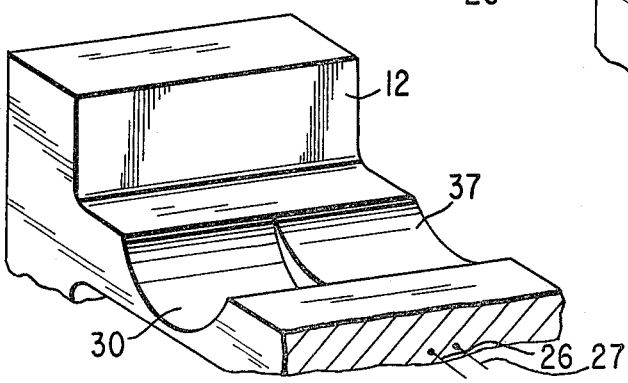

PARALLEL BEAM LOAD CELL INSENSITIVE TO POINT OF APPLICATION OF LOAD

BACKGROUND OF THE INVENTION

A. Field of the Invention

This invention relates to the field of load cells, and more particularly to parallel beam load cells.

B. Prior Art

It has long been well known to measure forces by utilizing strain gage elements bonded to an elastic beam which is loaded in bending by the unknown force. The use of two parallel beams rigidly interconnected at their ends in order to make the cell insensitive to the point of application of load has also been described. The insensitivity of a parallel beam load cell with respect to the location of the load follows from the fact that the loaded end of the beams, by the very nature of the parallelogram configuration, is constrained to move in a straight line. A simple stress analysis of a parallel beam load cell shows that the bending moments arising from the application of load not directly in line with the mid point of the beams (either longitudinally or transversely) are not resisted by the elastic restraint of the beams in the direction of the application of force, as is the direct force of the load, but the bending moments are rather resisted by axial tensile and compressive stresses, and/or by transverse bending stresses in the beams. Fortunately, the strain gage elements used can be positioned, and electrically connected, in such a way that the resistance changes due to axial beam stresses (caused by longitudinal bending moments) cancel, and do not alter the cell output. The effects of the transverse bending moments may be eliminated also by positioning the strain gage elements symmetrically with respect to the neutral axes of the beams (transversely) so that beam bending in the transverse direction does not cause the net resistance of the gages to change. Thus, despite varying strains in the beams caused by the shifting position of the load, the load cell output can be made to be responsive only to the magnitude of the applied load.

It has been found, however, that this fortuitous result depends upon maintaining a high degree of symmetry and homogeneity of the structure, and the strain gage elements bonded thereto. To the extent that there are asymmetries and inhomogeneities, the load cell will actually have a component of output which is a function of the point at which the load is applied, and this is a problem which must be faced when making high accuracy measurements.

The problem has been considered by inventors in the prior art by, e.g., Lockery, U.S. Pat. No. 3,576,128 and Farr, U.S. Patent No. 3,927,560. Lockery discloses an electrical method of compensating for load position errors due to load position changes in the axial direction with respect to the loaded beams, i.e., compensation for longitudinal moments about a transverse axis. Lockery utilizes the principle of desensitizing two of the strain gage elements of a four element bridge until the resistance changes of these two elements as a function of load position just offsets the resistance changes of the other two strain gage elements, so that no bridge output due to load position change appears.

Farr discloses a mechanical method of equalizing the resistance changes. Farr alters the cross sectional area of both beams in the parallelogram structure such that two strain gage elements which are subject to opposite stress changes due to load position changes (about the transverse axis) are made more sensitive to load position changes, to become just equal and opposite to the sensitivity of the other two strain gage elements, as a function of load position.

Neither of these patentees, nor others, have discussed the problem of load position sensitivity of load cells with respect to position changes transverse to the beam axes, i.e., moments about the longitudinal axis of the load cell.

SUMMARY OF THE INVENTION

The well-known parallel beam load cell is comprised of two spaced elastic beams which are rigidly connected at each end so as to form a parallelogram. One of the connected ends is supported, and a load may be applied to the other in a direction perpendicular to the beam axes, and parallel to the plane of the parallelogram. The beams are often made thinner in a narrow region near each end so that substantially all of the bending takes place in these regions. Such thinning allows lower range cells having a robust construction to be made. Strain gage elements bonded to the beams in the thinned regions sense the surface strain of the beams, and change in resistance responsive to the load, thereby providing a measure of the magnitude of the load. It is common to use four strain gage elements, two sensing compressive strain, and two sensing tensile strain, connected into a bridge so as to obtain a voltage output directly proportional to load. While the present invention is described in connection with a load cell having thinned sections, the application of the principles of the invention is not limited to this construction.

An important application of parallel beam load cells is in weighing, and for this application the cell may be provided with a weighing platform to hold the object being weighed. If the cell structure is perfectly symmetrical and homogeneous, high accuracy measurements can be made with this type of instrument, but if there is not perfect symmetry and homogeneity, the output of the cell may be influenced by the position of the load on the weighing platform, and lower accuracy measurements will result.

While weighing is not the only application for a parallel beam load cell, and this invention is useful in other applications, it is convenient to illustrate the principles of the invention by reference to a weighing cell, where the terms up, down, left, right, thickness, width, etc. will have well understood meanings. It will be realized by those skilled in the art that these terms are used herein merely to describe relationships and are not intended as limitations.

As the load is moved away from the support in the direction of the longitudinal axes of the beams, the upper beam will experience increasing tensile stress and the lower beam will experience increasing compressive stress. This is due to the increasing moment about the transverse axis of the cell. Because the parallelogram structure is deformed somewhat under load, the axial stresses on the beams will be eccentric and certain obscure bending stresses will appear in the thinned regions of the beams, as well as the tensile and compressive stresses described. The electrical bridge connection of the strain gage elements is normally such that strain gage element resistance changes resulting from the resulting tensile and compressive strains tend to offset each other, and no net change in bridge output is generated.

Since the unwanted resistance changes of all four elements are very unlikely to be exactly the same, some output change almost always appears as the load is moved. In accordance with the principles of the present invention, the cross sectional area of one of the beams, in the vicinity of one of the strain gages, is reduced, so as to alter the sensitivity of the strain gage bridge with respect to these load position moments in a direction and amount so as to reduce the net sensitivity of the load cell to longitudinal load position changes to a very low value. The tensile and compressive stresses on the beams due to the load position moments, and the bending stresses arising from the eccentric loading of the beams are both involved in the ability of any particular strain gage element to correct load position errors, and the effectiveness of each strain gage element depends upon the cell design and load range of the cell. In general, one or two particular strain gage elements may be effective in a particular load cell design, while the others may have less or negligible effect.

If the load is moved in a direction transverse to the beam axes, an imbalance from a different source is obtained. This type of load motion results in a tendency to bend the beams horizontally, the upper beam in one direction and the lower beam in the other direction. Each strain gage element is nominally located on the center line of the beam, horizontally, so that each nominally experiences equal tensile and compressive strains due to the horizontal bending of the beams, and thus they exhibit no net resistance change. To the extent that each strain gage element is not exactly aligned with the neutral axis of the beam, there will actually be resistance changes, and thus some bridge output.

According to the present invention, the shape of one of the beams in the vicinity of one of the strain gage elements is altered in such a way as to cause the neutral axis under said element to shift, either to the right or the left, as needed to cause an intentional resistance change in that element, as a function of load position, to offset the unintentional asymmetry of the load cell structure. By altering both the shape and cross sectional area of localized regions of the beams, the effects of both longitudinal and transverse load position shifts can be reduced to essentially zero.

BRIEF DESCRIPTION OF THE DRAWINGS

FIG. 4 is a perspective view of a portion of the parallelogram structure of the load cell of FIG. 1 in the vicinity of strain gage element 22, enlarged, and in particular showing the cross sectional shape and neutral axis of one of the beams.

FIG. 4a is a view similar to FIG. 4 and shows a first preferred embodiment modification to the beam shown in FIG. 4 in accordance with the present invention whereby a first type of load cell error may be reduced. The modification is shown exaggerated for clarity.

FIG. 4b is a view similar to FIG. 4 and shows a second preferred embodiment modification to the beam shown in FIG. 4 in accordance with the present invention whereby a first type of load cell error may be reduced. The modification is shown exaggerated for clarity.

FIG. 4c is a view similar to FIG. 4 and shows a third preferred embodiment modification to the beam shown in FIG. 4 in accordance with the present invention whereby a first type of load cell error by be reduced. The modification is shown exaggerated for clarity.

FIG. 5a is a perspective view of a portion of the parallelogram structure of the invented load cell in the vicinity of strain gage element 23 showing a first preferred embodiment modification to the beam shown in FIG. 4 in accordance with the present invention whereby a second type of load cell error may be reduced. The modification is shown exaggerated for clarity.

FIG. 5b is a view similar to FIG. 5a and shows a second preferred embodiment modification to the beam shown in FIG. 4 in accordance with the present invention whereby a second type of load cell error may be reduced. The modification is shown exaggerated for clarity.

FIG. 6 is a view similar to FIG. 5a and shows an embodiment of the present invention combining the modifications illustrated in FIGS. 4a and 5a. The modification is shown exaggerated for clarity.

DETAILED DESCRIPTION OF THE INVENTION

Figure 1:
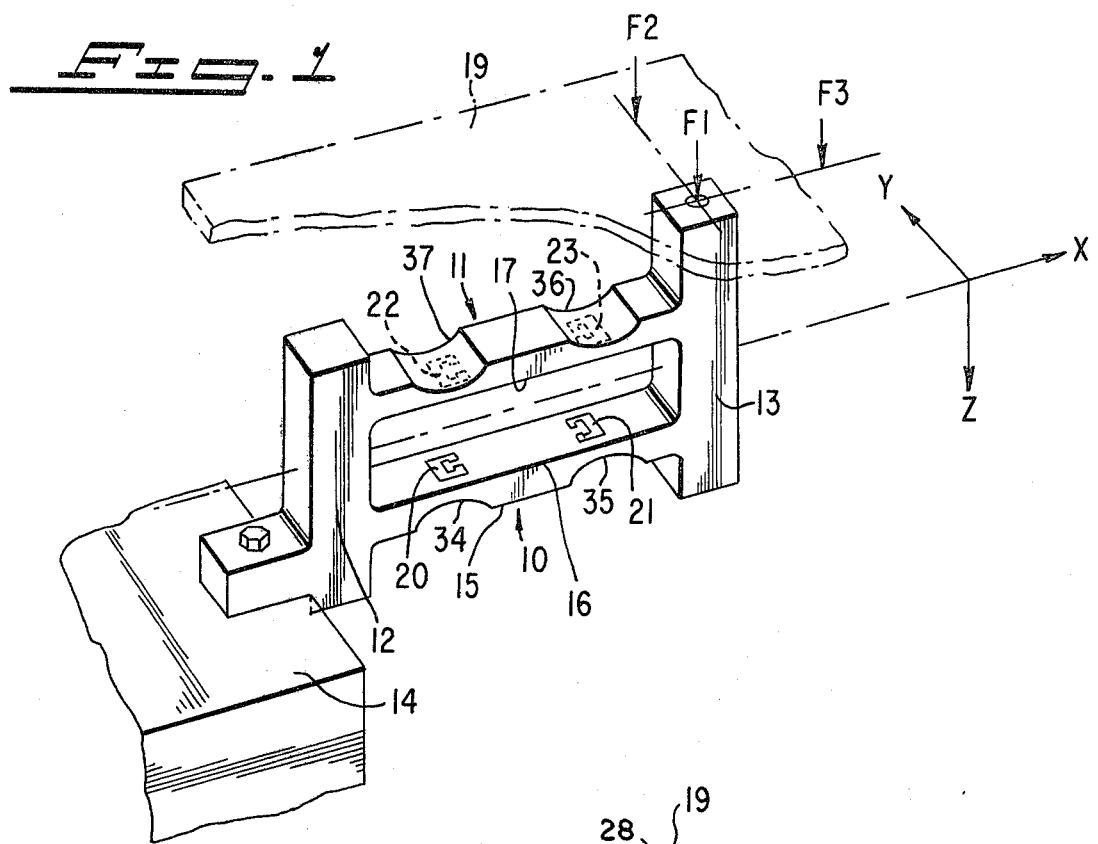
FIG. 1 is a perspective view of a parallel beam load cell according to the prior art, with a weighing platform, as used in weighing applications, shown partly broken away and in phantom lines.

A parallel beam load cell, adapted for weighing applications, as depicted in FIG. 1, includes a pair of spaced beam elements 10 and 11 rigidly joined at each end by cross members 12 and 13. As the name implies, the beams are substantially parallel, and the figure formed by the elements 10, 11, 12, and 13 is a rectangle. The cross sectional shape of each of the beams is commonly rectangular, although it is not necessary that this be the case. The cross sections of the beam elements 10 and 11, near the ends thereof are made thinner than the central section by cutting away portions of the beams, as shown at 34, 35, 36, and 37. It is convenient to make the thinning cutouts 34, 35, 36, and 37 cylindrical in shape as shown, but it is not necessary that such be the case. The result of such construction is that the major bending of the beam elements under load takes place in the thinned sections, with the heavier central section of the beams remaining substantially straight. Parallel beam load cells can also be made without the thinner sections of the beams, as described, but the construction shown herein is more common, particularly with respect to lower range cells.

The cross member 12 is adapted to be secured to a stationary base such as base 14, and cross member 13 is adapted to receive loads in the direction of the sensitive axis of the load cell (perpendicular to the longitudinal beam axes and parallel to the plane including both beam axes). For purposes of description, a set of three mutually orthogonal coordinate axes are defined and illustrated in FIG. 1 wherein the x axis, or longitudinal axis, is parallel to the longitudinal beam axis, the y axis, or transverse axis, is perpendicular to the plane including the longitudinal beam axes, and the z axis, or sensitive axis, is parallel to the plane including the longitudinal beam axes, and perpendicular to the longitudinal beam axes. In the aforementioned coordinate system, the function of a parallel beam load cell is to measure the component of applied loads parallel to the $z$, or sensitive, axis.

Figure 2:
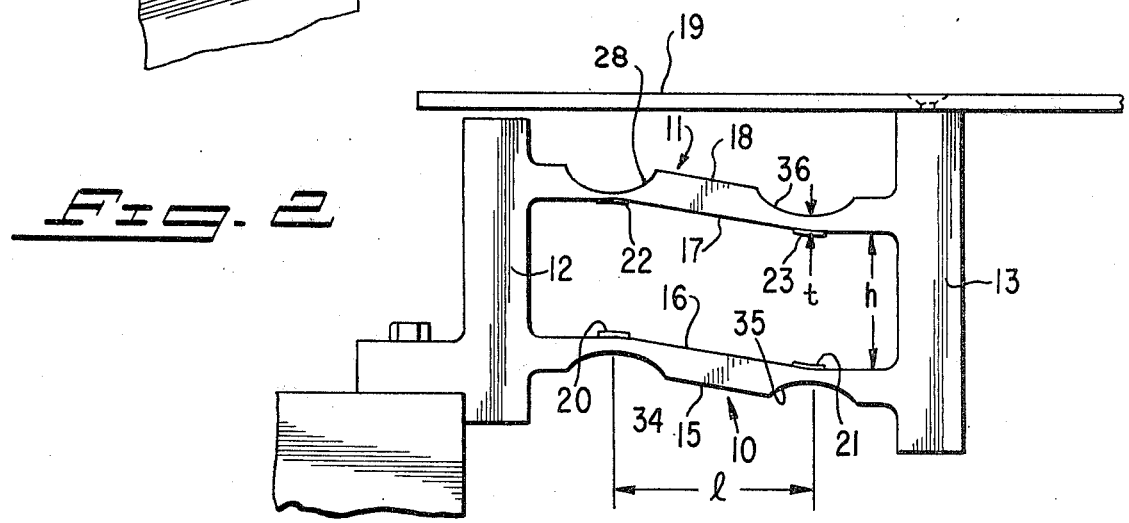
FIG. 2 is a side elevation view of a load cell of the type shown in FIG. 1, shown with a load applied. The deflection of the cell under load is exaggerated for clarity. The load cell as illustrated in FIG. 2 is shown modified in accordance with the preferred embodiment of the present invention as illustrated in detail in FIG. 4A.

When used in a weighing application, the $x$ and $y$ axes are horizontal and the $z$ axis is vertical. A weighing platform 19 is commonly attached to cross member 13 to accept the applied load, as illustrated in FIGS. 1 and 2.

The beam elements 10 and 11 are made of material which very nearly obeys Hooke's Law and thus the deflections of cross member 13, and the resultant strains at the surfaces 15, 16, 17, and 18 of the beam elements 10 and 11 are substantially proportional to the weight placed on platform 19 at any fixed position. The constant of proportionality between the load and the strain at any area on one of the beams will depend on the location of the weight on platform 19 and the location of the area being strained. For reasons which will be discussed below, the varying proportionality constants do not grossly affect the ability to measure weight, but do lead to secondary effects which are eliminated by the present invention.

The magnitude of the weight is measured electrically through the use of strain gage elements bonded to selected portions of the surfaces 15, 16, 17, and 18 in the region of the thinned sections 34, 35, 36 and 37. The cutouts which form the thinned beam sections are most conveniently machined on the outer surfaces of the parallelogram beams 15 and 18, while the strain gages are bonded to the inner surfaces 16 and 17 at the thinnest portions. The cutouts could, of course be on the inner surfaces 15 and 18, or could be on one outer and one inner surface, e.g., surfaces 15 and 17. The strain gage elements in these cases are still most conveniently bonded to the surface opposite the cutout.

Figure 3:
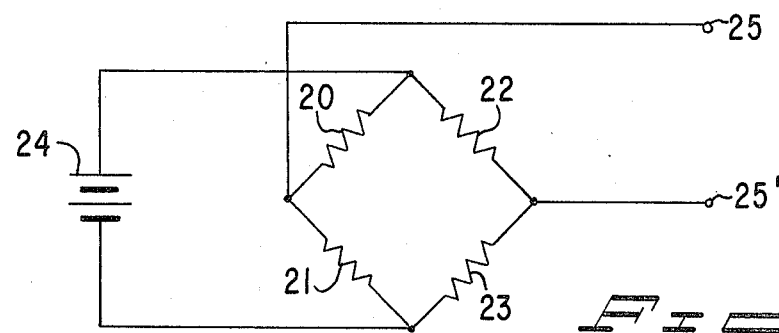
FIG. 3 is an electrical circuit diagram of a parallel beam load cell with four active arms.

The gages are connected into a bridge circuit such as illustrated in FIG. 3, which circuit further includes excitation battery 24 and output terminals 25 and 25'. With no weight on the platform 19, the bridge may be balanced, by means not shown, to give zero output at terminals 25 and 25'. If a weight is placed on platform 19, the beams 10 and 11 deflect, and strain gages 20 and 23 go into tension, while strain gages 21 and 22 into compression. This results in the bridge becoming unbalanced, and an output voltage substantially proportional to the applied weight appearing across terminals 25 and 25', 25' going positive with respect to 25.

If the load cell structure is perfectly homogeneous and symmetrical, and the strain gages have identical gage factors (the ratio of resistance change to strain), the cell output will be a function of weight only and independent of the location of the weight on platform 19. Perfect matching and symmetry are, of course, impossible to attain as a practical matter, and in high accuracy applications steps must be taken to compensate for certain secondary effects resulting from such imbalances.

To illustrate, if a weight is placed on the platform 19 at position F1, as shown in FIG. 1, and moved to a different position along the $x$ axis, for example to position F3, the effect on gages 20, 21, 22, and 23, as predicted by elementary mechanics, would be as if the weight remained stationary but that, in addition, a moment about an axis parallel to the $y$, or transverse, axis were applied to cross member 13. The resulting change in strain of the gages 20, 21, 22, and 23, according to the elementary theory of parallel beam load cells, will cause no change in bridge output if the load cell structure and gages are perfectly symmetrical and matched, since strain gages 22 and 23 will both increase in resistance the same amount so that the potential at terminal 25 will not change, and strain gages 20 and 21 will similarly both decrease in resistance, leaving the potential at terminal 25' unchanged.

It may be noted that an alternate circuit diagram of a parallel beam load cell may be used wherein strain gage elements 21 and 22, are interchanged electrically. If such a circuit is utilized, the potentials at terminals 25 and 25' will both change when the load is moved from F1 to F3, but there will still be no difference in output of the cell since the potential at each point will change the same amount.

If the gages are not identical, or if the structure is not perfectly homogeneous and symmetrical, however, these resistance changes will not compensate for each other, and there will be an output which is a function of the $x$ axis location of the load.

If the weight is moved along the $y$, or transverse, axis, a varying moment about the $x$ axis will be produced. Since each strain gage element is placed in the center of a beam, the net resistance of the gage elements should not change. If any of the gages are not perfectly symmetrical with respect to the neutral axis in bending of the beam with respect to forces applied in the $y$ direction, such gage will experience a change in resistance due to the $x$ axis moment, and the bridge will change in output.

In order to produce a load cell which is insensitive to these moments, and hence whose output is independent of the position of the weight on the weighing platform, the load cell is first made according to the prior art, using reasonable care in fabricating the cell structure for homogeneity and symmetry, and in selecting and placing the strain gages. The cell is then tested for $y$ and $x$ axis load position sensitivity by placing a weight on the platform 19 at 2 or more locations along the $x$ axis and $y$ axis respectively, for example, at positions F1, F2, and F3, and noting the changes in bridge output with respect to position.

In order to balance the cell with respect to transverse load position movements which cause moments about the $x$ axis, e.g., differences in output between positions F1 and F2, in accordance with the present invention, the cross sectional shape of the beam in the region of one of the strain gages is altered in order to cause the beam neutral axis to shift one direction or the other, and thus cause the gage at that location to have a change in resistance in response to the applied moment which will just compensate for the load position sensitivity of the uncompensated cell. For example, if moving a weight from F1 to F2 causes the junction of gages 20 and 21 (terminal 25) to go negative with respect to the junction of gages 22 and 23, (terminal 25') it can be seen that this output can be reduced to zero by, for example, causing the resistance of gage 22 to increase as the structure is twisted. The desired increase in resistance can be achieved by utilizing the principles of this invention as described below.

Referring now to FIG. 4, which shows a cross-section of the beam 11 in the vicinity of strain gage element 22, it can be noted that the neutral axis of the beam with respect to bending is indicated by the numeral 26. As a weight is moved in the positive $y$ direction, e.g. from F1 to F2, the resulting moment causes the parallelogram structure to twist, and the end of beam 11 will tend to move to the right (when viewed on end), and the end of beam 10 will tend to move to the left. Thus, in the vicinity of strain gage element 22, the portion of the beam to the left of the neutral axis 26 will go into tension and that to the right will go into compression. If strain gage 22 is perfectly symmetrical with respect to the neutral axis, it will not change in resistance. The other strain gage elements will experience similar strains, and perfect symmetry will result in no output change. Since one or more of the gages 20, 21, 22, and 23 almost surely will not be perfectly symmetrical with respect to their associated neutral axes, one or more of them will change in resistance, and the load cell will have an output which is a function of x axis load position.

It is possible to cause gage 22 to increase in resistance to compensate for the asymmetry postulated above, according to the principles of the present invention, by shifting the neutral axis 26 so that more of gage 22 is in the tension region. This may be accomplished, according to the present invention, by changing the cross sectional shape of the beam in the region of gage 22. The shape can be altered by tapering the beam as shown at numeral 28 of FIG. 4a, by cutting out the beam as shown at numeral 29 of FIG. 4b, by thinning the beam asymmetrically as shown at numeral 30 of FIG. 4c, or other shape altering means. Each of the shape altering means disclosed in FIG. 4 causes the neutral axis to shift to the right, for example to the location indicated by numeral 27, and thereby gage 22 will experience a greater tensile stress and a lesser compressive stress. The shifted axis 27 is shown away from the structure in the figures for clarity, but it will be understood by those skilled in the art that the shift in the neutral axis actually takes place only in the region of the beam which has been altered.

This shape altering, to introduce a compensating resistance change into the bridge, can be accomplished with respect to any one of the strain gages in the bridge, or any two or more, as convenient, the above description with respect to strain gage element 22 being for purposes of example only. The direction of shift of the neutral axis can of course be chosen as needed to cause the selected gage to either increase or decrease in resistance in response to a particular direction of load shifts.

If a weight is placed on platform 19 and moved in the direction of the positive x axis, e.g. from F1 to F3, a moment will be created about the y axis which will vary with the position of the load along the x axis. Strain gages 22 and 23 will experience an increasing tensile strain on account of the change in position of the load, and strain gages 20 and 21 will experience the opposite. If the beams 10 and 11 are identical and homogenous, and strain gages 20 through 23 are perfectly placed and have identical gage factors, these varying strains will not result in a varying bridge output, since the change in resistance of strain gage 20 will be just compensated for by an equal change in resistance of strain gage 21, and the change in the resistance of strain gage 22 will be compensated for by change in resistance of strain gage 23.

Perfect identity and homogeneity is, of course, not possible, and any real load cell will have an output which contains a component which varies with x axis load position. In order to avoid such an output, which, of course, results in an error in the measurement, a portion of one of the beams 10 or 11 may be reduced in cross section to compensate for the sensitivity of the load cell to load position in the direction of the x axis. If changing the positon of a load from F1 to F3 results in the junction of strain gages 20 and 21 (terminal 25) going positive with respect to the junction of strain gages 22 and 23, (terminal 25') it can be seen that such an output change can be eliminated by causing the resistance of either strain gage 20 or 23 to simultaneously increase by a suitable factor, or causing either strain gage 21 or 22 to decrease by a suitable factor. Since strain gage 21 will experience increasing compressive strain, and strain gage 23 will experience increasing tensile strain as the load is moved in the positive x direction, if the cross section of the beam in the region of either is reduced by the proper amount, the change in resistance of the affected strain gage will be greater in response to load position shift so as to just compensate for the x axis load position sensitivity of the uncompensated load cell. If the change in load position from F1 to F3 results in terminal 25 going negative instead of positive with respect to terminal 25', the sensitivity of either of strain gage elements 20 or 22 can be altered as described above to compensate the cell. As will be discussed below, this analysis assumes that the primary effect involved in strain element moment sensitivity is the tensile and compressive stresses in the beams 10 and 11 due to the load shift moments, and that bending effects are not substantial. Depending on the detail design of the load cell, this condition may or may not obtain, and the particular strain gage element or elements which are effective to compensate the load cell for longitudinal load position shifts may have to be determined experimentally.

In order that compensating the load cell for x axis position sensitivity does not adversely affect the y axis position sensitivity, such reduction in cross section is preferably made in a manner which does not result in a movement of the neutral axis of the beam. The means illustrated in FIGS. 5a and 5b illustrate typical means by which the cross section of the beam may be reduced. FIG. 5a depicts the region of beam 11 adjacent strain gage 23 reduced in cross sectional area by being thinned, at numeral 31, in order to achieve the desired increase in resistance change due to load position change, and FIG. 5b depicts the same region of beam 11 being narrowed to accomplish the same result, at numerals 32 and 32'.

Changing the shape of one of the beams in a local area in order to shift it's neutral axis, and therby compensate the load cell for y axis load position sensitivity, as described above, involves removing material from the beam so that its cross sectional area is reduced, as well as it's shape changed. Since changing the cross sectional area of a portion of one of the beams also affects the x axis load position sensitivity, it is possible to make both adjustments simultaneously. For example, suppose that a particular load cell has an output at the junction of strain gages 20 and 21 which goes negative when the load is moved in the positive x axis direction and also when the load is moved in the negative y axis direction. Cutouts 32 and 32' in the region of strain gage 23 can be made the appropriate depth to reduce the beam cross sectional area just enough so that the bridge will have a constant output as the load is moved along the x axis. By making cutout 32 shallower than cutout 32', the neutral axis of beam 11 can be made to move toward cutout 32 and thus cause strain gage 23 to experience a greater tensile strain as the load is moved in the negative y direction. If the neutral axis under strain gage 23 is moved to the proper location, the load cell as a whole will have no sensitivity to load position movement in the y direction. The same type of simultaneous adjustment of x axis and y axis load position sensitivity can be made using other combinations of the compensation techniques disclosed herein, as will occur to those skilled in the art. For example, the means of x axis load position sensitivity compensation illustrated in FIG. 4a can be combined with the means of y axis load position sensitivity compensation illustrated in FIG. 5a and both applied to the region in the vicinity of one of the strain gages to accomplish total compensation. This particular combination is illustrated in FIG. 6, at numeral 33, for purposes of example.

As noted in the section of this application entitled Summary of the Invention, there is more than one factor contributing to the effectiveness of particular strain gage elements with respect to correcting longitudinal load position errors, and the particular design of the gage structure will determine which elements are effective. For example, it has been found experimentally that a load cell constructed of steel and having an "h" dimension (see FIG. 2) of about 2.5 inches, and an "l" dimension of about 3.5 inches, and a "t" dimension between 0.02 inches and 0.120 inches (depending on the range desired) results in a family of load cells wherein strain gage elements 21 and 22 are essentially ineffective to compensate for longitudinal load position errors, while elements 20 and 23 are very useful using the technique illustrated in FIG. 5A, i.e. thinning the "t" dimension. The effect of elements 20 and 23 is, however, opposite to the simple theory discussed above, that is, thinning the web at element 23 corrects for a negative output shift due to positive load position shift along the x axis, instead of the opposite as it would according to the simple theory. It is apparent that with the particular load cell design described as an example, the effects arising from the eccentric loading of the deflected beams by the load position moments far outweigh the tensile and compressive effects.

While the contribution of the various factors to the net effectiveness of particular strain gage elements is not completely understood in a theoretical manner, it is a simple matter to experimentally ascertain the proper element to accomplish the desired results for a particular design of load cell.

What has been described is a parallel beam load cell and a method of adjusting parallel beam load cells to make same insensitive to the location of the load. Various modifications and alterations to the embodiments disclosed will fall within the spirit of the invention and such modifications and alterations are intended to be covered by the appended claims.

I claim:
1. A load cell which comprises:
   (a) support means;
   (b) a pair of spaced parallel beams each having a longitudinal axis and each being rigidly attached to said support means;
   (c) load receiving means rigidly attached to both of said beams at the ends thereof remote from said support means, for receiving loads to be measured; and
   (d) a plurality of strain responsive means responsive to strains at preselected areas on the surface of said beams, said strain responsive means being interconnected whereby an electrical signal responsive to said load may be obtained, the cross section of one said beams being altered to cause the neutral axis of said beam to shift in the region of one of said preselected areas whereby the sensitivity of said load cell to moments with respect to said support means created by the application of said loads will be reduced, said cross section being altered after said strain responsive means are positioned at said preselected areas.

2. A load cell as recited in claim 1 where said beam cross sectional shape is altered by tapering said beam.

3. A load cell as recited in claim 1 where said cross sectional shape is altered to shift said neutral axis by removing material from said beam asymmetrically with respect to said neutral axis.

4. A load cell as recited in claim 1 where said cross sectional shape is altered by removing material from said beam on one side of said neutral axis.

5. A load cell as recited in claim 1 where said cross sectional shape is altered by thinning said beam asymmetrically with respect to said neutral axis.

6. A load cell as recited in claim 1 where said cross sectional shape is altered by asymmetrically reducing the width of said beam.

7. A load cell as recited in claim 1 where said cross section of one of said beams is altered by altering both its cross sectional area and the location of its neutral axis whereby the sensitivity to moments about said longitudinal beam axes and said transverse beam axes will be reduced.

8. A load cell as recited in claim 7 where said cross sectional area and said location of said neutral axis are altered by removing material from said beam asymmetrically with respect to said neutral axis.

9. A load cell as recited in claim 7 where said cross sectional area and said location of said neutral axis are altered by tapering said beam.

10. A load cell as recited in claim 7 where said cross sectional area and the location of said neutral axis are altered by removing material from said beam on one side of said neutral axis.

11. A load cell as recited in claim 7 where said cross sectional area and the location of said neutral axis are altered by thinning said beam asymmetrically with respect to said neutral axis.

12. A load cell as recited in claim 7 where said cross sectional area and the location of said neutral axis are altered by asymmetrically reducing the width of said beam.

13. A method of reducing the sensitivity to moments of a parallel beam load cell of the type which includes a pair of spaced parallel beams rigidly interconnected at their respective ends, and a plurality of strain responsive means responsive to strains at selected regions of said beams which comprises the steps of:
   (a) determining the change in output of said load cell with respect to the change in position of application of load to said load cell; and
   (b) altering the cross section of one of said beams so as to cause the neutral axis of said beam to shift in the region of one of said selected regions whereby said change in output is reduced.

14. A method as recited in claim 13 where said change in position is a change transverse to the longitudinal axes of said beams.

15. A method as recited in claim 14 where said neutral axis is shifted by removing material from said beam asymmetrically with respect to said neutral axis.

16. A method as recited in claim 14 where said neutral axis is shifted by removing material from said beam on one side of said neutral axis.

17. A method as recited in claim 14 where said neutral axis is shifted by thinning said beam asymmetrically with respect to said neutral axis.

18. A method as recited in claim 14 where said neutral axis is shifted asymmetrically reducing the width of said beam.

19. A method as recited in claim 14 where said neutral axis is shifted by tapering said beam.

20. A method as recited in claim 13 where said change in output is determined with respect to both a change in position in the direction of the longitudinal axes of said beams and a change in position transverse said longitudinal axes and said cross section is altered whereby said neutral axis of said beam is shifted and said cross sectional area is reduced.

21. A method as recited in claim 20 where said cross section is altered by removing material asymmetrically from said beam.

22. A method as recited in claim 20 where said cross section is altered by tapering said beam.

23. A method as recited in claim 20 where said cross section is altered by asymmetrically narrowing said beam.

24. A method as recited in claim 20 where said cross section is altered by thinning said beam assymmetrically.

25. A method of reducing the sensitivity to load position of a parallel beam load cell of the type having a pair of spaced parallel beams rigidly interconnected at their respective ends and a plurality of strain responsive elements responsive to surface strains at selected regions of said beams which comprises the steps of:
 (a) applying a load to said load cell at at least two locations with respect to the support of said load cell;
 (b) measuring the difference in output of said load cell on account of changing said location of application of load;
 (c) altering the cross section of one of said beams so as to cause the neutral axis of said beam to shift in the region of one of said selected regions whereby said difference in output is reduced.

26. A method as recited in claim 25 where two of said locations are spaced in the direction of a line transverse the longitudinal axes of said beams whereby a change in moment about said longitudinal axes is effected, and said cross section is altered whereby the neutral axis of said beam at said one of said selected regions is displaced.

27. A method as recited in claim 26 where said cross section is altered to displace said neutral axis by removing material from said beam asymmetrically with respect to said neutral axis.

28. A method as recited in claim 26 where said cross section is altered by tapering said beam.

29. A method as recited in claim 26 where said cross section is altered by removing material from said beam on one side of said neutral axis.

30. A method as recited in claim 26 where said cross section is altered by thinning said beam asymmetrically.

31. A method as recited in claim 26 where said cross section is altered by narrowing said beam asymmetrically.

32. A method of reducing the sensivity to moments created by misalignments of applied loads with the support in a parallel beam load cell of the type having a pair of spaced parallel beams rigidly connected at their respective ends and a plurality of strain responsive means responsive to strain at selected regions of said beams which comprises the steps of:
 (a) determining the change in output of said load cell with respect to a change in position of application of load in a direction parallel to the longitudinal axes of said beams;
 (b) determining the change in output of said load cell with respect to the change in position of application of load in a direction transverse to the longitudinal axes of said beams;
 (c) shifting the location of the neutral axis of one of said beams at one of said selected regions whereby the change in load cell output due to a transverse change in position of load will be reduced; and
 (d) altering the cross sectional area of one of said beams at one of said selected regions whereby the change in load cell output due to a longitudinal change in position of load will be reduced.

33. A method as recited in claim 32 where said shifting in location of said neutral axis and said altering of said cross sectional area are accomplished at the same selected region.

34. A method as recited in claim 33 where said shifting in location of said neutral axis and said altering of cross sectional areas are accomplished by asymmetrically removing material from said beam at said selected region.

35. A method as recited in claim 34 where said shifting and altering are accomplished by tapering said beam.

36. A method as recited in claim 32 where said shifting in location of said neutral axis is accomplished at a first of said selected regions and said altering the cross sectional area is accomplished at a second of said selected regions.

37. A method as recited in claim 36 where the beam at said first selected region has material removed therefrom asymmetrically with respect to the neutral axis and the beam at said second selected region has material symmetrically removed therefrom.

* * * * *